Patented Mar. 6, 1945

2,370,688

UNITED STATES PATENT OFFICE 2,370,688

TERPENE RESINS

Alfred L. Rummelsburg, Wilmington, Del., assignor to Hercules Powder Company, Wilmington, Del., a corporation of Delaware No Drawing. Application November 8, 1941, Serial No. 418,323

19 Claims. (Cl. 260—23)

This invention relates to new compositions of matter and methods of producing the same; and in particular it relates to liquid resinous copolymers suitable for use in protective coatings.

In accordance with this invention, it has been found that various terpenes or mixtures thereof may be copolymerized with acyclic unsaturated monobasic fatty acids having between 12 and 22 carbon atoms and the glyceryl esters thereof. The polymerization reaction is carried out in the presence of a suitable catalyst and under suitable operating conditions to yield a series of new liquid resins which have many interesting and useful characteristics. These new resins are of particular interest inasmuch as they contain carboxyl and ester groups which are polar. The presence of these polar groups broaden their field of application. Thus, those containing carboxyl groups may be esterified with mono- and polyhydric alcohols, they may be reacted with inorganic bases to form salts. The copolymers containing ester groups may be saponified, hydrogenated, etc.

The terpene constituent of the mixture subjected to polymerizing conditions may be any terpene hydrocarbon having the empirical formula $C_{10}H_{16}$, or a mixture thereof. For example, there may be employed acyclic terpenes, such as, myrcene, ocimene, allo-ocimene, cryptotaenene, etc.; monocyclic terpenes, such as, dipentene, alpha-terpinene, beta-terpinene, gamma-terpinene, terpinolene, sylvestrene, alpha-phellandrene, beta-phellandrene, origanene, the pyronenes, etc.; bicyclic terpenes, such as, alpha-thujene, beta-thujene, sabinene, the carenes, alpha-pinene, beta-pinene, camphene, bornylene, alpha-fenchene, beta-fenchene, gamma-fenchene, etc.

In place of pure terpenes or their synthetic mixtures, naturally-occurring terpene mixtures may be employed, as for example, wood or gum turpentine. Other fractions containing crude mixtures of terpenes obtained as a result of the recovery of oleoresinous materials from pine wood may be employed, as for example, "Solvenol," a mixture containing the monocyclic terpene hydrocarbons, terpinene, terpinolene and dipentene. Other terpene mixtures, as pyrolyzed alpha-pinene containing as much as 40% allo-ocimene, pyrolyzed beta-pinene containing as much as 65% myrcene, etc. may be employed. Other terpene mixtures obtained in the synthesis of ethers and alcohols from alpha- and beta-pinene are operable.

In accordance with the invention, the additional constituents of the mixture submitted to polymerizing conditions will be an acyclic unsaturated monobasic fatty acid having between 12 and 22 carbon atoms, or the glyceryl ester of such a fatty acid. Accordingly, any of the following fatty acids may be employed: hypogeic, physetoleic, palmitoleic, lycopodic, oleic, rapic, petroselinic, cheiranthic, doeglic, jecoleic, gadoleic, erucic, brassidic, isoerucic, palmitolic, linoleic, millet oil, telfairic, eleomargaric, eleostearic, tariric, humoceric, eicosinic, linolenic, jecoric, isolinolenic, isanic acid, clupanodonic, therapic, arachidonic, etc. The more highly unsaturated fatty acids, i. e., those having at least two double bonds per molecule such as palmitolic, linoleic, eleomargaric, eleostearic, linolenic, clupanodonic, etc. acids have been found to be of preferred utility.

The glyceryl esters of the aforesaid fatty acids may be neutral esters, i. e., those having no free hydroxyl groups such as triolein, trilinolein, etc.; they may be partial esters, i. e., those having free hydroxyl groups such as diolein, dilinolein, etc.; they may be symmetrical such as in triolein, trilinolein, etc.; or they may be unsymmetrical such as in dioleomonostearin, dilinoleostearin, etc. The commercially available, naturally-occurring mixtures of the glyceryl esters of the aforesaid fatty acids, also the fatty acids obtainable therefrom, may be employed. Hence, linseed oil, hemp oil, poppyseed oil, China wood oil, soybean oil, perilla oil, cottonseed oil, corn oil, menhaden fish oil, oiticica oil, safflower oil, sunflower seed oil, fish oil, dehydrated castor oil, rape seed oil, walnut oil, rubber seed oil, hop seed oil, etc., may be used.

In accordance with the invention, a mixture of a terpene and an acyclic unsaturated monobasic fatty acid or glyceryl ester thereof, desirably in the presence of an inert solvent, is contacted with a polymerization or condensation catalyst at a temperature which promotes the copolymerization of the constituents for a period sufficiently long to secure a substantial yield of copolymerized product. Desirably, the reaction mixture will be vigorously agitated.

As polymerization catalysts, there may be employed the metal halides, such as, boron trifluoride and its molecular complexes with ethers and acids, titanium chloride, ferric chloride, and the halides of metals whose hydroxides are amphoteric, as aluminum chloride, stannic chloride, zinc chloride, etc.; acids, such as, hydrofluoric acid, fluoroboric acid, polybasic mineral acids, as orthophosphoric acid, tetraphosphoric acid, sulfuric acid, etc., acyl sulfuric acids, as acetyl sulfuric acid, alkyl sulfuric acids, as ethyl sulfuric acid, para-toluene sulfonic acid, etc.; and activated clays, such as, fuller's earth, diatomaceous earth, alumina, bauxite, synthetic magnesium silicates, etc. For the acid catalysts, certain anhydrides, as phosphorus pentoxide, etc., may be equivalently employed. The activated clays will desirably be calcined at temperatures of, for example, from 100° C. to 500° C. prior to use.

The catalyst to reactant ratio will generally vary between about 0.01 and about 1.0, preferably between about 0.05 and about 0.5. The operable temperature will vary between about −20° C. and about 300° C., and the operable reaction period will vary between about 0.5 hour and about 48 hours or more, preferably between about 4 and about 24 hours. Preferably, where a metal halide or acid catalyst is employed, a temperature between about 0° C. and about 60° C. will be used. With an activated clay catalyst the preferred temperatures are between about 175° C. and about 220° C. The ratio of terpene to fatty acids or their glyceryl esters may vary between about 0.1 and about 3.0, preferably between about 0.5 and about 1.5.

As solvents, any organic liquid which is inert to the reactants and catalysts may be employed. Aliphatic hydrocarbons, such as, gasoline, petroleum naphtha, butane, pentane, hexane, etc.; aromatic hydrocarbons, such as, benzene, toluene, xylene, etc.; cyclic hydrocarbons, such as, cyclohexane, decahydronaphthalene, etc.; esters, such as, methyl acetate, ethyl acetate, propyl acetate, isopropyl acetate, n-butyl acetate, etc.; halogenated hydrocarbons, such as, chloroform, ethylene dichloride, carbon tetrachloride, trichloroethylene, ethyl chloride, methylene chloride, etc., may be employed. When the catalyst aluminum chloride is used, a chlorinated solvent, as ethylene dichloride, etc. is preferred.

Following the reaction, the catalyst will be removed by any desired method, as water-washing, etc. Where as the catalyst, a halide of a metal whose hydroxide is amphoteric has been employed, it is preferred to wash the reaction mixture with cold or hot solutions of inorganic acids, as for example, hydrochloric acid, sulfuric acid, etc. Thereby, catalyst-copolymer complexes are more readily decomposed, and the reaction mixture may be thereafter water-washed. Traces of dispersed complexes of metal halide catalysts may be further removed by treating the reaction mixture with an adsorbent such as fuller's earth, Filter-Cel, activated carbon, etc. The solvent is then removed, preferably by distillation under reduced pressure.

The color of the final products may be improved by utilizing terpenes which have been distilled from caustic. Also, the use of an inert atmosphere, such as, carbon dioxide, nitrogen, etc., during the reaction yields pale-colored products. Other refining agents which may be employed include the adsorbents hereinbefore mentioned, also selective solvents, such as, furfural, furfural alcohol, phenol, etc. If desired, the copolymer resins obtained in accordance with the processes described herein may be subjected to vacuum distillation to remove volatile copolymers, leaving copolymer residues having higher melting points than the initial copolymerization product.

The following specific examples are given as illustrative of the invention. All parts and percentages in the specification and claims are by weight unless otherwise indicated.

Example 1

One hundred parts of China-wood oil fatty acids and 65 parts of dipentene were dissolved in 250 parts of benzene. The dipentene employed contained 20% cymene which was unreactive under the conditions employed. Gaseous boron trifluoride was introduced into the solution until 7.5 parts had been absorbed, with agitation and cooling to maintain a temperature between 5 and 15° C. The resulting solution was allowed to stand for 22 hours at 0 to 3° C. and then washed with water at 60° C. to remove the catalyst. The benzene, cymene and unreacted constituents were removed by vacuum distillation, employing a final bath temperature of 190° C. and a pressure of 15 mm. The resulting copolymer was a liquid viscous resin and was obtained in the amount of 130 parts. It had an acid number of 133, a saponification number of 138 and a color of F on the rosin scale.

Example 2

A solution was made up consisting of 100 parts of linseed oil, 150 parts of beta-pinene and 250 parts of benzene. The beta-pinene contained a small amount of alpha-pinene. Ten parts of gaseous boron trifluoride were introduced and absorbed by the solution with constant agitation and cooling to maintain a temperature of 5 to 15° C. The resulting homogeneous reaction mixture was allowed to stand at 0 to 3° C. for 20 hours and was then washed with water at 60° C. The copolymer was recovered in the amount of 241 parts as in Example 1. It was a viscous liquid resin having an acid number of 45, a saponification number of 64 and a color of K on the rosin scale.

Example 3

One hundred parts of soybean fatty acids and 55 parts of beta-pinene were dissolved in 163 parts of benzene. The beta-pinene employed contained a small amount of alpha-pinene. Nine parts of gaseous boron trifluoride were introduced and absorbed by the resulting solution with accompanying agitation while maintaining the temperature at from 5 to 15° C. The homogeneous reaction mixture was allowed to stand at 0 to 3° C. for 18 hours and was then washed with water at 60° C. The copolymer was recovered in the amount of 153 parts as in Example 1. It was a viscous liquid resin having an acid number of 101, a saponification number of 120 and a color of I on the rosin scale.

Example 4

One hundred parts of linseed oil and 80 parts of 95% allo-ocimene were agitated at 180° C. with 40 parts of fuller's earth for a period of 7 hours under reflux in an atmosphere of $CO_2$. The allo-ocimene employed contained a very small amount of alpha-pinene and dipentene. The fuller's earth had a particle size of 80 mesh and had previously been calcined at 450° C. for 0.5 hour. At the end of the reaction period the catalyst was filtered from the hot mixture. Unreacted constituents were removed by vacuum distillation employing a final bath temperature of 190° C. and a pressure of 15 mm. One hundred seventy parts of a copolymer resin resulted which was a viscous oil having an acid number of 9, a saponification number of 60 and a color of K on the rosin scale.

Example 5

One hundred parts of linseed oil, 110 parts of alpha-pinene, 75 parts of xylene and 50 parts of aqueous 85% orthophosphoric acid were heated at 120° C. for a period of 9 hours with agitation under reflux in an atmosphere of $CO_2$. An acid sludge formed which was separated, and the remaining solution was washed with water at 60° C. to remove the acid catalyst. Xylene and unreacted constituents were removed by means of vacuum distillation employing a final bath temperature of 190° C. and a pressure of 15 mm. One hundred sixty parts of a liquid viscous resin resulted having an acid number of 10, a saponification number of 65 and a color of G on the rosin scale.

Example 6

Forty parts of linseed oil and 90 parts of myrcene were dissolved in 150 parts of toluene. A solution of 9 parts of anhydrous stannic chloride in 25 parts of toluene was added thereto while stirring vigorously at a temperature of 5 to 12° C. After standing for a period of 8 hours at 60° C., the reaction mixture was washed with 1000 parts of aqueous 15% sulfuric acid at 60° C., and then with water at 40° C. The toluene solution was then filtered through 15 parts of Filter-Cel (diatomaceous earth). The toluene was removed as in Example 1. Ninety parts of a copolymer resin resulted which was a viscous oil having an acid number of 6, a saponification number of 42 and a color of H on the rosin scale.

Example 7

Fifty parts of linseed oil fatty acids and 50 parts of wood turpentine were dissolved in 300 parts of ethylene dichloride. A solution of 15 parts of stannic chloride in 50 parts of ethylene dichloride was added thereto with agitation and cooling during 5 minutes, while maintaining the temperature below 20° C. The homogeneous reaction mixture was then kept at a temperature of between 0 and 5° C. for 24 hours, then given 2 washes with 600 parts of aqueous 15% hydrochloric acid at 50° C., and finally washed with water. The solvent was removed by vacuum distillation using a final bath temperature of 150 to 175° C. and a pressure of 15 mm. Ninety parts of a dark-colored copolymer resin resulted which was a viscous oil having an acid number of 98 and a saponification number of 110.

Example 8

The process of Example 7 was duplicated with the exception that Florida menhaden fish oil replaced the linseed oil fatty acids. The copolymerized product was a dark-colored viscous resin having an acid number of 12 and a saponification number of 52.

Example 9

A mixture of 200 parts of China-wood oil, 250 parts of 60% allo-ocimene and 100 parts of aqueous 85% orthophosphoric acid was agitated at 30° C. for 7 hours and for an additional one-half hour at 50° C. The allo-ocimene employed contained alpha-pinene, dipentene and a small amount of unidentified terpenes. The resulting viscous liquid was diluted with toluene and washed with water. The solvent and unreacted constituents were then removed by vacuum distillation using a final bath temperature of 195° C. and a pressure of 15 mm. to obtain 375 parts of a very viscous liquid resin. It had an acid number of 9 and a saponification number of 70.

The copolymer resins prepared in accordance with this invention which are acids may be esterified with mono- and polyhydric alcohols to provide resins which are useful in the preparation of protective coatings, adhesives, and in the field of textile impregnations. Thus, monohydric alcohol esters such as the methyl, ethyl, propyl, isopropyl, butyl, amyl, etc., esters, polyhydric alcohol esters such as the ethylene glycol, diethylene glycol, triethylene glycol, glycerol, diglycerol, triglycerol, pentaerythritol, dipentaerythritol, etc., esters may be utilized. Both these esters and the copolymers resulting from the reaction of terpenes with the various glycerol esters of fatty acids are highly advantageous in their use in protective coating compositions inasmuch as they impart much greater drying rates to the coating films, particularly as compared with coating compositions containing terpene polymers.

Salts of the terpene-fatty acid copolymers may be prepared. Some of these salts, as the cobalt, etc. salts may be employed as driers in protective coatings. Others of the salts such as those formed by the complete or partial neutralization of the terpene-fatty acid resins with, for example, calcium oxide, calcium acetate, zinc oxide, zinc acetate, etc. are useful as film-forming materials for use in protective coatings. The sodium and ammonium salts act as emulsifying agents. The terpene-fatty acid copolymers may also be used in the manufacture of soaps. Both the terpene-fatty acid copolymers and the copolymers made from the glyceryl esters of a fatty acid may be treated with hydrogen in the presence of either base metal or noble metal catalysts to yield hydrogenated resins having improved stability characteristics. Furthermore, the copolymers may be disproportionated by treatment with hydrogenation catalysts in the absence of hydrogen in a manner more fully disclosed in U. S. Patent 2,154,629 to E. R. Littmann. Either type of copolymer resin may be converted to higher molecular weight copolymers by heating at a temperature between about 250° C. and about 325° C.

The resinous copolymers of this invention may be used alone or in conjunction with other materials in the lamination of glass, paper, wood, textile materials, etc. They may also be used in the form of solutions or emulsions as impregnants for paper, textiles, wood, etc., to impart flexibility thereto. The solubility characteristics of these copolymer resins are such that they may be dissolved in common solvents such as gasoline, turpentine, benzene, xylene, etc. They are only partially soluble in solvents such as ethyl alcohol, acetone, etc.

What I claim and desire to protect by Letters Patent is:

1. A resinous copolymer consisting essentially of a product resulting from the copolymerization of a mixture consisting of a terpene hydrocarbon having the empirical formula $C_{10}H_{16}$ and a material selected from the group consisting of the acyclic unsaturated monobasic fatty acids of between 12 and 22 carbon atoms and the glyceryl esters thereof, carried out in the presence of a catalyst capable of polymerizing the reaction and an inert organic solvent, at a temperature between about —20° C. and about 300° C.

2. A resinous copolymer consisting essentially of a product resulting from the copolymerization of a mixture consisting of a monocyclic hydrocarbon having the empirical formula $C_{10}H_{16}$ and a material selected from the group consisting of the acyclic unsaturated monobasic fatty acids of between 12 and 22 carbon atoms and the glyceryl esters thereof being present in an amount of at least one-third part by weight for each part by weight of the terpene present, carried out in the presence of a catalyst capable of polymerizing the reaction and an inert organic solvent, at a temperature between about —20° C. and about 300° C.

3. A resinous copolymer consisting essentially of a product resulting from the copolymerization of a mixture consisting of dipentene and a material selected from the group consisting of the acyclic unsaturated monobasic fatty acids of between 12 and 22 carbon atoms and the glyceryl esters thereof being present in an amount of at least one-third part by weight for each part by weight of the terpene present, carried out in the presence of a catalyst capable of polymerizing the reaction and an inert organic solvent, at a temperature between about —20° C. and about 300° C.

4. A resinous copolymer consisting essentially of a product resulting from the copolymerization of a mixture consisting of dipentene and China-wood oil acid being present in an amount of at least one-third part by weight for each part by weight of the terpene present, carried out in the presence of a catalyst capable of polymerizing the reaction and an inert organic solvent, at a temperature between about —20° C. and about 300° C.

5. A resinous copolymer consisting essentially of a product resulting from the copolymerization of a mixture consisting of a bicyclic terpene hydrocarbon having the empirical formula $C_{10}H_{16}$ and a material selected from the group consisting of the acyclic unsaturated monobasic fatty acids of between 12 and 22 carbon atoms and the glyceryl esters thereof being present in an amount of at least one-third part by weight for each part by weight of the terpene present, carried out in the presence of a catalyst capable of polymerizing the reaction and an inert organic solvent, at a temperature between about —20° C. and about 300° C.

6. A resinous copolymer consisting essentially of a product resulting from the copolymerization of a mixture consisting of alpha-penene and a material selected from the group consisting of the acyclic unsaturated monobasic fatty acids of between 12 and 22 carbon atoms and the glyceryl esters thereof being present in an amount of at least one-third part by weight for each part by weight of the terpene present, carried out in the presence of a catalyst capable of polymerizing the reaction and an inert organic solvent, at a temperature between about —20° C. and about 300° C.

7. A resinous copolymer consisting essentially of a product resulting from the copolymerization of a mixture consisting of alpha-pinene and linseed oil acid being present in an amount of at least one-third part by weight for each part by weight of the terpene present, carried out in the presence of a catalyst capable of polymerizing the reaction and an inert organic solvent, at a temperature between about —20° C. and about 300° C.

8. A resinous copolymer consisting essentially of a product resulting from the copolymerization of a mixture consisting of beta-pinene and a material selected from the group consisting of the acyclic unsaturated monobasic fatty acids of between 12 and 22 carbon atoms and the glyceryl esters thereof being present in an amount of at least one-third part by weight for each part by weight of the terpene present, carried out in the presence of a catalyst capable of polymerizing the reaction and an inert organic solvent, at a temperature between about —20° C. and about 300° C.

9. A resinous copolymer consisting essentially of a product resulting from the copolymerization of a mixture consisting of beta-pinene and soy bean acid being present in an amount of at least one-third part by weight for each part by weight of the terpene present, carried out in the presence of a catalyst capable of polymerizing the reaction and an inert organic solvent, at a temperature between about —20° C. and about 300° C.

10. In resinous copolymer formation the improvement characterized by the process comprising copolymerizing a mixture consisting of a terpene hydrocarbon having the empirical formula $C_{10}H_{16}$ and a material selected from the group consisting of the acyclic unsaturated monobasic fatty acids of between 12 and 22 carbon atoms and the glyceryl esters thereof in the presence of a catalyst capable of polymerizing the reaction and an inert organic solvent, at a temperature of between about —20° C. and about 300° C., until copolymerization is substantially complete.

11. In resinous copolymer formation the improvement characterized by the process comprising copolymerizing a mixture consisting of a terpene hydrocarbon having the empirical formula $C_{10}H_{16}$ and a material selected from the group consisting of the acyclic unsaturated monobasic fatty acids of between 12 and 22 carbon atoms and the gylceryl esters thereof being present in an amount of at least one-third part by weight for each part by weight of the terpene present, in the presence of anhydrous stannic chloride and an inert organic solvent, at a temperature of between about 0° C. and about 60° C., until copolymerization is substantially complete.

12. In resinous copolymer formation the improvement characterized by the process comprising copolymerizing a mixture consisting of a terpene hydrocarbon having the empirical formula $C_{10}H_{16}$ and linseed oil acid being present in an amount of at least one-third part by weight for each part by weight of the terpene present, in the presence of anhydrous stannic chloride and an inert organic solvent, at a temperature of between about 0° C. and about 60° C., until copolymerization is substantially complete.

13. In resinous copolymer formation the improvement characterized by the process comprising copolymerizing a mixture consisting of alpha-pinene and linseed oil acid being present in an amount of at least one-third part by weight for each part by weight of alpha-pinene present, in the presence of anhydrous stannic chloride and benzene, at a temperature of between about 0° C. and about 60° C., until copolymerization is substantially complete.

14. In resinous copolymer formation the improvement characterized by the process comprising copolymerizing a mixture consisting of a terpene hydrocarbon having the empirical formula $C_{10}H_{16}$ and a material selected from the group consisting of the acyclic unsaturated monobasic fatty acids of between 12 and 22 carbon atoms and the glyceryl esters thereof being present in an amount of at least one-third part by weight for each part by weight of the terpene present, in the presence of boron trifluoride and an inert organic solvent, at a temperature of between about 0° C. and about 60° C., until copolymerization is substantially complete.

15. In resinous copolymer formation the improvement characterized by the process comprising copolymerizing a mixture consisting of a terpene hydrocarbon having the empirical formula $C_{10}H_{16}$ and China-wood oil acid being present in an amount of at least one-third part by weight for each part by weight of the terpene present, in the presence of boron trifluoride and an inert organic solvent, at a temperature of between about 0° C. and about 60° C., until copolymerization is substantially complete.

16. In resinous copolymer formation the improvement characterized by the process comprising copolymerizing a mixture consisting of dipentene and China-wood oil acid being present in an amount of at least one-third by weight for each part by weight of dipentene present, in the presence of boron trifluoride and benzene at a temperature of between about 0° C. and about 60° C., until copolymerization is substantially complete.

17. In resinous copolymer formation the improvement characterized by the process comprising copolymerizing a mixture consisting of a terpene hydrocarbon having the empirical formula $C_{10}H_{16}$ and a material selected from the group consisting of the acyclic unsaturated monobasic fatty acids of between 12 and 22 carbon atoms and the glyceryl esters thereof being present in an amount of at least one-third part by weight for each part by weight of the terpene present, in the presence of fuller's earth and an inert organic solvent, at a temperature of between about 175° C. and about 220° C., until copolymerization is substantially complete.

18. In resinous copolymer formation the improvement characterized by the process comprising copolymerizing a mixture consisting of a terpene hydrocarbon having the empirical formula $C_{10}H_{16}$ and soybean acid being present in an amount of at least one-third part by weight for each part by weight of the terpene present, in the presence of fuller's earth and an inert organic solvent, at a temperature of between about 175° C. and about 220° C., until copolymerization is substantially complete.

19. In resinous copolymer formation the improvement characterized by the process comprising copolymerizing a mixture consisting of beta-pinene and soybean acid being present in an amount of at least one-third part by weight for each part by weight of beta-pinene present, in the presence of fuller's earth, at a temperature between about 175° C. and about 220° C., until copolymerization is substantially complete.

ALFRED L. RUMMELSBURG.